United States Patent Office 3,847,881
Patented Nov. 12, 1974

3,847,881
STRESS-CRACK RESISTANT ETHYLENE-PERHALOETHYLENE COPOLYMERS
Max M. Mueller, Morristown, and Swayambu Chandrasekaran, East Orange, N.J., assignors to Allied Chemical Corporation, New York, N.Y.
No Drawing. Filed Apr. 30, 1973, Ser. No. 355,828
Int. Cl. C08f 15/40
U.S. Cl. 260—80.77      8 Claims

ABSTRACT OF THE DISCLOSURE

Thermal stress-cracking characteristics of copolymers of about 40 to 60 mol percent of ethylene with about 40 to 60 mol percent of halogenated comonomers selected from the group consisting of tetrafluoroethylene, chlorotrifluoroethylene and mixtures thereof are improved by incorporating therein from 0.1 to 10 mol percent, based on the mols of halogenated comonomer, of 3,3,3-trifluoro-2-trifluoromethyl propene.

BACKGROUND OF THE INVENTION

Copolymers of 40 to 60 mol percent of ethylene with from 40 to 60 mol percent of chlorotrifluoroethylene or tetrafluoroethylene are known. Copolymers of 40 to 60 mol percent of ethylene with 40 to 60 mol percent of mixtures of tetrafluoroethylene and chlorotrifluoroethylene are disclosed herein.

While copolymers of 40 to 60 mol percent of ethylene with 40 to 60 mol percent of tetrafluoroethyelne, chlorotrifluoroethylene or mixtures thereof have high melting points, generally in the order of above about 200° C., their use at temperatures above about 150° C. has been severely restricted due to their tendency to stress-crack at such temperatures. At such temperatures they crack under tensile stresses appreciably below the limits of their short-term strength.

To overcome the stress-cracking tendency of ethylene/chlorotrifluoroethylene and ethylene/tetrafluoroethylene copolymers, it has already been proposed to incorporate in these copolymers small amounts in the order of 0.1 to 10 mol percent of copolymerizable vinyl monomer which is free of telogenic activity and which provides a side chain having at least two carbon atoms, said side chain being aromatic or having its elements bonded together by single bonds only. The requirement that the vinyl monomer must have a side chain having at least two carbon atoms is a requirement for a minimum bulk in the side chain which was thought to be required in order to impart improved high temperature tensile properties to such copolymers, and that no improvement would be realized if that minimum bulk requirement is not met. Thus, it has been shown, for example, that hexafluoropropene and isobutylene, neither of which provide side chains having at least two carbon atoms, are ineffective in providing resistance to thermal stress-cracking when used in amounts in which vinyl monomers having side chains of at least two carbon atoms provide such resistance.

There is always a need for other comonomers which, when incorporated in copolymers of 40 to 60 mol percent of ethylene with 40 to 60 mol percent of halogenated comonomers selected from the group consisting of tetrafluoroethylene, chlorotrifluoroethylene and mixtures thereof, improves thermal stress-crack resistance at elevated temperature, without having significant adverse effect on thermal stability.

SUMMARY OF THE PRESENT INVENTION

In accordance with the present invention, it has been discovered that incorporation of minor amounts of 3,3,3-trifluoro-2-trifluoromethyl propene having the formula $(CF_3)_2C=CH_2$ into copolymers of 40 to 60 mol percent of ethylene with 40 to 60 mol percent of halogenated comonomers selected from the group consisting of tetrafluoroethylene, chlorotrifluoroethylene and mixtures thereof greatly improves the thermal stress-crack resistance of such copolymers.

In accordance with the present invention there are provided copolymers of from about 40 to 60 mol percent of ethylene, from about 40 to 60 mol percent of halogenated comonomer selected from the group consisting of tetrafluoroethylene, chlorotrifluoroethylene and mixtures thereof, and from 0.1 to 10 mol percent, based on the mols of halogenated comonomer, of 3,3,3-trifluoro-2-trifluoromethyl propene. The stress-crack resistant modified copolymers of the present invention are especially suited for use in articles such as tubes, film and coatings. They are suitable for continuous duty use at temperatures above 150° C. and as high as that approaching their melting point. They are especially suitable for making wire coatings and tubings by extrusion at fast rates without melt fracture, and for coating articles by powder coating methods, especially by fluid bed powder coating methods.

DETAILED DESCRIPTION OF THE INVENTION

The ethylene, tetrafluoroethylene and chlorotrifluoroethylene monomers required for making copolymers of the present invention are commercially available.

The 3,3,3-trifluoro-2-trifluoromethyl propene monomer may be prepared as described by Kauffman et al. in J. Org. Chem. *31*, 3090 (1966). Briefly, its preparation involves refluxing hexafluoro-2-methyl-2-propanol with phosphorous pentachloride to obtain the desired 3,3,3-trifluoro-2-trifluoromethyl propene as non-condensed overhead product, together with concurrently formed hydrogen chloride. The hydrogen chloride can be removed from the crude overhead product by conventional techniques, such as by distillation or by scrubbing with alkaline media.

Stress-crack resistance of copolymers in accordance with the present invention is determined by either the Mandrel Wrap Test as described in ASTM D–2951–71 for polyethylene, modified to employ test temperature of 180° C. or 200° C. instead of 100° C., or by a Bent Strip Test. In the latter test a 2.5 by 0.25 by 0.060 inch strip of polymer plaque which has been air-cooled from the melt after compression molding is bent over a 0.25 inch diameter bar and the free ends of the test strip are clamped together. A load of 1,150 grams is attached to the clamp and the entire assembly is kept in an oven at test temperature of 180 or 200° C. Time to break is a measure of resistance to thermal stress-cracking.

The copolymers of the present invention may be prepared using known polymerization methods, such as, e.g., the method disclosed in Neucleonics, September 1964, pp. 72–74, for making high melting 1:1 alternate copolymer of ethylene and chlorotrifluorofluoroethylene using radiation as catalyst at 0° C.; as shown in British Patent 949,422 by bulk copolymerization of ethylene with the halogenated comonomer at temperatures between —80° C. to +50° C. using oxygen-activated alkyl boron catalysts; or as shown by Ragazzini et al.'s U.S.P.'s 3,371,076 and 3,501,446. They may also be prepared by batchwise bulk copolymerization of the monomers at temperatures of about 0° C., say between —20 to +20° C., at superatmospheric pressure in an agitated pressure vessel, preferably in the presence of inert chlorofluorocarbon solvent, by charging the vessel with 3,3,3-trifluoro-2-trifluoromethyl propene and the halogenated monomer and admitting gaseous ethylene into the vessel, using organic peroxide type initiators effective at such temperatures and, if desired, in the presence of small amounts of chain transfer agents such as chloroform or heptane to modify molecular weight. The copolymers of the present invention may also be prepared by polymerization in aqueous suspension or dispersion using known procedures.

DESCRIPTION OF PREFERRED EMBODIMENTS

The following examples illustrate preferred embodiments of the present invention and set forth the best mode presently contemplated for its practice.

EXAMPLE 1

A one gallon stainless steel autoclave is charged with 1.5 liters deionized, deaerated water and 150 ml. methanol. The autoclave is evacuated and 10 grams 3,3,3-trifluoro-2-trifluoromethyl propene are introduced, followed by 1,000 grams chlorotrifluoroethylene. Ethylene gas is charged into the autoclave to total pressure of 125 p.s.i.g. at 0° C., followed by one gram trichloroacetylperoxide dissolved in 5 ml. 1,1,2-trifluoro-1,2,2-trichloroethane solvent, and 3.5 ml. chloroform (chain terminator). Polymerization is conducted at 0 to 5° C. under good agitation for a period of 1½ hours. At the end of that period autoclave pressure is released, the polymer product is recovered by filtration, washed with methanol and dried at 110° C. under 10 mm. Hg pressure for 20 hours. There are obtained 125 grams of polymer product containing about equimolar portions of ethylene and chlorotrifluoroethylene and about 2.5 mol percent of 3,3,3-trifluoro-2-trifluoromethyl propene. Yield of polymer product is 12.5 percent, based on the weight of the chlorotrifluoroethylene charged.

The polymer product has a melting point, determined by differential scanning calorimeter, of 231° C. It has a melt index determined by ASTM D1238–65T at 275° C. under 2,160 grams load of 0.46 grams for 10 minutes. It passes the Mandrel Wrap Test at 180° C. when subjected to that temperature for a period of seven days. It shows no breaks by the Bent Strip Test at 180° C. for seven hours, and is capable of withstanding temperatures of 200° C. by that test for periods of 200 to 270 minutes to break.

The above procedure is repeated to obtain copolymers of ethylene with chlorotrifluoroethylene containing no added 3,3,3-trifluoro-2-trifluoromethyl propane comonomer, as well as to obtain copolymers in accordance with the present invention containing varying amounts of 3,3,3-trifluoro-2-trifluoromethyl propene. In these runs the amount of chloroform chain terminator employed is varied in order to obtain polymer products of different molecular weights, hence different melt indices. These polymerization runs and results obtained are summarized in Table I below. In each case melt index, Mandrel Wrap Test and Bent Strip Test are run on polymers stabilized against thermal degradation by addition of 0.3 percent by weight of Mark 158 stabilizer supplied by Argus Chemical Company which is a mixture of phosphite of sterically hindered phenol and a carboxylic acid salt of a metal of Group II of the Periodic System, and 0.15 percent by weight of distearyl thiodipropionate.

TABLE I

| Polymer composition (mol percent) | | 3,3,3-trifluoro-2-trifluoromethyl propene monomer in feed to autoclave | Melt index [1] | DSC melting point, ° C. (20° C./min. heating rate) | Bent strip test time in minutes to break at— | |
|---|---|---|---|---|---|---|
| Ethylene | Chlorotrifluoroethylene | | | | 180° C. | 200° C. |
| About 50 | About 50 | 0 | 4 | 240–245 | 5–9 | 1–4. |
| Do | do | 0 | 1.1 | 240–245 | 8–80 | 1–7. |
| Do | do | 0 | 0.5 | 240–245 | 14–30 | 1–29. |
| Do | do | 0 | 0.1 | 240–245 | No break in 6 hours | 6–65. |
| Do | do | 2 | [2]7 | 212 | No break [4] | No break.[5] |
| Do | do | 1.2 | [3]1.4 | 220 | do. [6] | |
| Do | do | 0.7 | 0.45 | 231 | No break in 7 hours | 200–270. |

[1] Determined at 275° C. under 2,160 g. load.
[2] Determined at 245° C. under 2,160 g. load.
[3] Determined at 255° C. under 2,160 g. load.
[4] No break in 40 minutes, slipped clamp after 40 minutes.
[5] No break in 30 minutes, slipped clamp after 30 minutes.
[6] No break in 70 minutes, slipped clamp after 70 minutes.

EXAMPLE 2

The procedure of Example 1 is repeated, substituting tetrafluoroethylene for the chlorotrifluoroethylene, to obtain copolymers of ethylene with tetrafluoroethylene containing no added 3,3,3-trifluoro-2-trifluoromethyl propene comonomer, as well as to obtain copolymers in accordance with the present invention containing varying amounts of 3,3,3-trifluoro-2-trifluoromethyl propene. In these runs the amount of chloroform chain terminator employed is varied in order to obtain polymer products of different molecular weights, hence different melt indices. These polymerization runs and results obtained are summarized in Table II below. In each case melt index, Mandrel Wrap Test and Bent Strip Test are run on polymers stabilized against thermal degradation by addition of 0.3 percent by weight of Mark 158 stabilizer supplied by Argus Chemical Company which is a mixture of phosphite of sterically hindered phenol and a carboxylic acid salt of a metal of Group II of the Perodic System, and 0.15 percent by weight of distearyl thiodipropionate.

TABLE II

| Polymer composition (mol percent) | | 3,3,3-trifluoro-2-trifluoromethyl propene monomer in feed to autoclave | Melt index [1] | DSC melting point ° C. (20° C./min. heating rate) | Bent strip test time in minutes to break at 200° C. | | Results of mandrel-wrap tests at 200° C. for 7 days |
|---|---|---|---|---|---|---|---|
| Ethylene | Tetrafluoroethylene | | | | Quick-quenched | Air-cooled | |
| About 50 | About 50 | 0 | 0.6 | 295 | 4–11 | 1–3 | Failed. |
| Do | do | 1.5 | 2.8 | 265 | No break in 6 hours | | Passed. |
| Do | do | 2.30 | 0.6 | 255 | | No break in 8 hours | Do. |

[1] Melt index run at 30° C. above the melting point using 2,160 gms. load.

EXAMPLE 3

This example shows preparation of terpolymer of ethylene, chlorotrifluoroethylene and tetrafluoroethylene.

A 450 ml. Fisher-Porter aerosol bottle equipped with magnetic stirrer is charged with 250 ml. of trichlorofluoromethane. Bottle and contents are chilled to $-78°$ in a Dry-Ice/trichloroethylene bath. The bottle is evacuated to 5 mm. Hg for 5 minutes to remove air, and 0.25 grams of trichloroacetyl peroxide is introduced as a 20 percent by weight solution in 1,1,2-trichloro-2,2,1-trifluoroethane, followed by monomer charge of 39 grams of chlorotrifluoroethylene, 58 grams of tetrafluoroethylene, and 10 grams of ethylene. Based on that monomer charge, the composition of monomer dissolved in the trichlorofluoromethane reaction medium is calculated to be 26 mol percent of chlorotrifluoroethylene, 28 mol percent of ethylene and 46 mol percent of tetrafluoroethylene at contemplated reaction temperature of about $0°$ C. The bottle is transferred into an aqueous ethylene/glycol bath maintained at $0°$ C., bottle contents are agitated and maintained at temperature of $-2°$ C. to $+2°$ C. for a period of 20 minutes. At the end of this period the bottle is vented, the polymer slurry is poured into 250 ml. of methanol, stirred for 15 minutes, filtered, the solids are washed with methanol on the filter and are dried at $100°$ C. at 10 mm. Hg vacuum for 20 hours. About 5 grams of polymer solids are obtained containing 11.9 percent chlorine and 35.6 percent carbon, from which a terpolymer composition is calculated of 22.6 mol percent chlorotrifluoroethylene, 50.3 mol percent ethylene and 27.1 mol percent tetrafluoroethylene.

Following the above outlined procedure, but varying the ethylene composition in the feed from 25 to 28 mol percent, varying the chlorotrifluoroethylene composition in the feed from 15 to 62 mol percent, and varying the tetrafluoroethylene composition in the feed from 13 to 57 mol percent, there are obtained terpolymer compositions containing from 45 to 50 mol percent of ethylene, from 15 to 47 mol percent of chlorotrifluoroethylene and from 6 to 35 mol percent of tetrafluoroethylene having DSC melting points ranging from $250°$ C. for a terpolymer containing about 47 mol percent of chlorotrifluoroethylene, 47 mol percent of ethylene and 6 mol percent of tetrafluoroethylene, to $284°$ C. for a terpolymer containing about 50 mol percent chlorotrifluoroethylene, 50 mol percent of ethylene and 35 mol percent of tetrafluoroethylene. Copolymers of ethylene and halogenated comonomer of a mixture of tetrafluoroethylene and chlorotrifluoroethylene, unmodified by 3,3,3-trifluoro-2-trifluoromethyl propene, have advantageous mechanical properties at elevated temperatures.

As above discussed, the prior art had suggested incorporating into ethylene/chlorotrifluoroethylene and ethylene/tetrafluoroethylene copolymers small amounts, in the order of 0.1 to 10 mol percent, of "polymerizable" vinyl monomer which is free of telogenic activity and which provides a side chain having at least 2 carbon atoms, said side chain being aromatic or having its elements bonded together by single bonds only. As previously explained, the requirement that the vinyl monomer must have a side chain having at least 2 carbon atoms is a requirement for minimum bulk in the side chain which was thought to be required in order to impart improved high temperature tensile properties to such copolymers. We have now further discovered that not only the bulk of the side chain, but that also the type substituents on the side chain is of critical importance in order to obtain such modified copolymers having improved stress-crack resistance. Thus, we have found that if vinylidene chloride is substituted for the 3,3,3-trifluoro-2-trifluoromethyl propene employed in the stress-crack resistant copolymers of our invention, copolymer compositions are obtained which are not suitable for use in high temperature environments and which present fabrication difficulties because of their low thermal stability. Thus, even comonomers which satisfy the bulk requirement, as does vinylidene chloride, may still not impart improved high temperature stress-crack resistance. The comparative test below shows production of about equimolar ethylene/chlorotrifluoroethylene copolymer, modified by small amounts of vinylidene chloride.

COMPARATIVE TEST

A one gallon stainless steel autoclave is charged with 1.5 liters deionized, deaerated water and 150 ml. methanol. The autoclave is cooled to $0°$ C., evacuated, charged with 1,000 grams of chlorotrifluoroethylene, followed by ethylene gas to a total pressure of 130 p.s.i.g.

A 500 cc. stainless steel cylinder is charged with a solution of 12 grams vinylidene chloride monomer in 390 ml. 1,1,2-trifluoro-1,2,2-trichloroethane, and the cylinder is pressurized with nitrogen to 400 p.s.i.g. Cylinder contents are charged into the autoclave to 25 p.s.i. pressure drop in the cylinder. Four ml. of a solution of 0.25 gm./ml. trichloroacetyl peroxide in 1,1,2-trichloro-2,2,1-trifluoroethane are then introduced into the autoclave to initiate polymerization, and additional vinylidene chloride monomer is added every half hour from the cylinder to a 25 p.s.i. pressure drop within the cylinder. Each such vinylidene chloride monomer addition corresponds to 0.20 mol percent, based on the chlorotrifluoroethylene charged into the reactor.

After 7 hours polymerization at $0°$ C., the autoclave is vented, and the polymer product is recovered as described in Example 1. There are obtained 40 grams of polymer product having DSC melting point of $236°$ C., and having a degree of crystallinity corresponding to about 80 percent of that of unmodified chlorotrifluoroethylene copolymer. Yield of polymer product is 4 percent, based on the weight of chlorotrifluoroethylene charged. Total amount of vinylidene chloride monomer charged during the course of the run amounts to 3.0 mol percent, based on the chlorotrifluoroethylene.

Attempts to measure the melt index of this polymer, after stabilization with the previously described stabilizer system, are unsuccessful due to degradation and charring of the polymer at test temperature of $265°$ C. Also, no test specimens can be compression molded for measurement of stress-crack resistance without severe char and bubble formation in the molded plaques.

When mixtures of tetrafluoroethylene and chlorotrifluoroethylene in any proportion are substituted for the chlorotrifluoroethylene or tetrafluoroethylene in the above Examples 1 and 2, similar results are obtained, that is to say, copolymer compositions are obtained which have high resistance to thermal stress-cracking at elevated temperatures.

Preferred copolymers of the present invention contain about equimolar amounts of ethylene and halogenated copolymer, and preferably from about 0.5 to about 5 mol percent of 3,3,3-trifluoro-2-trifluoromethyl propene, based on the mols of halogenated comonomer.

When the halogenated comonomer is a mixture of tetrafluoroethylene and chlorotrifluoroethylene, then the tetrafluoroethylene and chlorotrifluoroethylene are preferably in molar ratios of 0.1:1 to 1:0.1, more preferably of 0.5:1 to 1:0.5. Most preferably, the tetrafluoroethylene and chlorotrifluoroethylene are employed in about equimolar amounts.

As is known to those skilled in the art, various additives such as stabilizers or fillers and the like may be blended with the copolymers of the present invention to promote their usefulness in specific applications.

Since various changes and modifications may be made in the invention without departing from the spirit and essential characteristics thereof, it is intended that all matter contained in the above description shall be interpreted as illustrative only, the invention being limited only by the scope of the appended claims.

We claim:
1. Solid copolymers of from about 40 to 60 mol percent of ethylene, from about 40 to 60 mol percent of halogenated comonomer selected from the group consisting of tetrafluoroethylene, chlorotrifluoroethylene and mixtures thereof and from 0.1 to 10 mol percent, based on the mols of halogenated comonomer, of 3,3,3-trifluoro-2-trifluoromethyl propene.
2. Copolymers according to claim 1 containing from 0.5 to 5 mol percent of 3,3,3-trifluoro-2-trifluoromethyl propene, based on the mols of halogenated comonomer.
3. Copolymers according to claim 1 wherein the halogenated comonomer is tetrafluoroethylene.
4. Copolymers according to claim 3 containing from 0.5 to 5 mol percent of 3,3,3-trifluoro-2-trifluoromethyl propene, based on the mols of tetrafluoroethylene.
5. Copolymers according to claim 1 wherein the halogenated comonomer is chlorotrifluoroethylene.
6. Copolymers according to claim 5 containing from 0.5 to 5 mol percent of 3,3,3-trifluoro-2-trifluoromethyl propene, based on the mols of chlorotrifluoroethylene.
7. Copolymers according to claim 1 wherein the halogenated comonomer is a mixture of tetrafluoroethylene and chlorotrifluoroethylene.
8. Copolymers according to claim 7 containing from 0.5 to 5 mol percent of 3,3,3-trifluoro-2-trifluoromethyl propene, based on the mols of halogenated comonomer.

References Cited
UNITED STATES PATENTS

| | | | |
|---|---|---|---|
| 3,240,757 | 3/1966 | Sterling | 260—63 |
| 3,624,250 | 11/1971 | Carlson | 260—80.75 |
| 3,738,923 | 6/1973 | Carlson et al. | 204—159.2 |

STANFORD M. LEVIN, Primary Examiner

U.S. Cl. X.R.

260—23 XA, 87.5 B